(12) United States Patent
Reed et al.

(10) Patent No.: US 9,940,684 B2
(45) Date of Patent: *Apr. 10, 2018

(54) DETECTING ENCODED SIGNALS UNDER ADVERSE LIGHTING CONDITIONS USING ADAPTIVE SIGNAL DETECTION

(71) Applicant: Digimarc Corporation, Beaverton, OR (US)

(72) Inventors: Alastair M. Reed, Lake Oswego, OR (US); Brett A. Bradley, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/869,365

(22) Filed: Sep. 29, 2015

(65) Prior Publication Data

US 2016/0093011 A1     Mar. 31, 2016

Related U.S. Application Data

(63) Continuation of application No. 13/165,564, filed on Jun. 21, 2011, now Pat. No. 9,147,222.

(60) Provisional application No. 61/357,864, filed on Jun. 23, 2010.

(51) Int. Cl.
*H04M 1/00* (2006.01)
*G06T 1/00* (2006.01)
*H04N 5/232* (2006.01)
*H04N 5/235* (2006.01)

(52) U.S. Cl.
CPC .......... *G06T 1/0021* (2013.01); *H04N 5/2351* (2013.01); *H04N 5/2354* (2013.01); *H04N 5/23293* (2013.01); *G06T 2201/0065* (2013.01)

(58) Field of Classification Search
CPC ......... H04M 1/72522; H04M 1/72527; H04M 1/7253
USPC .................... 455/556.1; 348/222.1, 500, 513
See application file for complete search history.

(56) References Cited

U.S. PATENT DOCUMENTS

| 4,736,241 A | 4/1988 | Murakami et al. |
| 4,989,025 A | 1/1991 | Matsumura et al. |
| 5,668,603 A | 9/1997 | Copeland |
| 5,862,260 A | 1/1999 | Rhoads |
| 6,026,193 A | 2/2000 | Rhoads |
| 6,122,403 A | 9/2000 | Rhoads |

(Continued)

FOREIGN PATENT DOCUMENTS

| WO | WO 9953428 | 10/1999 |
| WO | WO 0007356 | 2/2000 |

OTHER PUBLICATIONS

Oct. 18, 2011 International Search Repot, Written Opinion of the International Searching Authority, and Search History (dated Oct. 7, 2011); all from PCT No. PCT/US 11/41469.

(Continued)

*Primary Examiner* — William D Cumming
(74) *Attorney, Agent, or Firm* — Digimarc Corporation (57) ABSTRACT

The disclosure relates to image signal processing, encoded signals and fingerprinting. Lighting information, associated with image capture, is used to adapt a signal encoder to fingerprint generator. The encoder or generator can be adapted by applying different weightings to different color channels, the different weightings being associated with the lighting information.

18 Claims, 7 Drawing Sheets

(56) References Cited

U.S. PATENT DOCUMENTS

| | | | |
|---|---|---|---|
| 6,345,104 B1 | 2/2002 | Rhoads | |
| 6,408,082 B1 | 6/2002 | Rhoads et al. | |
| 6,449,377 B1 | 9/2002 | Rhoads | |
| 6,522,769 B1 | 2/2003 | Davis | |
| 6,577,080 B2 * | 6/2003 | Lys | H05B 33/0803 315/292 |
| 6,590,996 B1 | 7/2003 | Reed et al. | |
| 6,614,914 B1 | 9/2003 | Rhoads et al. | |
| 6,718,046 B2 | 4/2004 | Reed | |
| 6,763,123 B2 | 7/2004 | Reed et al. | |
| 6,870,570 B1 | 3/2005 | Bowser | |
| 6,891,959 B2 | 5/2005 | Reed et al. | |
| 6,912,295 B2 | 6/2005 | Reed et al. | |
| 6,947,571 B1 | 9/2005 | Rhoads et al. | |
| 7,020,304 B2 | 3/2006 | Alattar et al. | |
| 7,072,487 B2 | 7/2006 | Reed | |
| 7,289,643 B2 | 10/2007 | Brunk et al. | |
| 7,298,919 B2 | 11/2007 | Ejiri et al. | |
| 7,421,125 B1 | 9/2008 | Rees | |
| 7,486,827 B2 | 2/2009 | Kim | |
| 7,650,624 B2 * | 1/2010 | Barsoum | G06Q 30/0207 348/513 |
| 7,847,950 B2 * | 12/2010 | Badju | A61B 5/0066 356/479 |
| 7,900,236 B2 * | 3/2011 | Barsoum | G06Q 30/0207 348/513 |
| 7,930,546 B2 | 4/2011 | Rhoads et al. | |
| 8,488,900 B2 | 7/2013 | Conwell | |
| 9,147,222 B2 * | 9/2015 | Reed | G06T 1/0021 |
| 2002/0044659 A1 | 4/2002 | Ohta | |
| 2003/0112237 A1 | 6/2003 | Corbetta | |
| 2004/0117856 A1 * | 6/2004 | Barsoum | G06Q 30/0207 725/138 |
| 2004/0218833 A1 | 11/2004 | Ejiri et al. | |
| 2004/0258274 A1 | 12/2004 | Brundage et al. | |
| 2006/0106317 A1 * | 5/2006 | McConnell | A61B 5/0059 600/476 |
| 2007/0104389 A1 | 5/2007 | Wells | |
| 2007/0253594 A1 | 11/2007 | Lu et al. | |
| 2007/0274561 A1 | 11/2007 | Rhoads | |
| 2008/0174570 A1 | 7/2008 | Jobs et al. | |
| 2008/0195336 A1 * | 8/2008 | Badju | A61B 5/0066 702/75 |
| 2008/0298632 A1 | 12/2008 | Reed | |
| 2008/0317278 A1 | 12/2008 | Lefebvre | |
| 2009/0086024 A1 | 4/2009 | Brookins | |
| 2009/0175555 A1 | 7/2009 | Mahowald | |
| 2010/0026782 A1 | 2/2010 | Benitez | |
| 2010/0104209 A1 | 4/2010 | Deever et al. | |
| 2010/0119153 A1 | 5/2010 | Rai | |
| 2010/0141837 A1 * | 6/2010 | Barsoum | G06Q 30/0207 348/500 |
| 2010/0150396 A1 | 6/2010 | Reed | |
| 2010/0150434 A1 | 6/2010 | Reed | |
| 2010/0219758 A1 | 9/2010 | Melzner et al. | |
| 2010/0274643 A1 * | 10/2010 | Barsoum | G06Q 30/0207 705/14.1 |
| 2011/0317875 A1 | 12/2011 | Conwell | |
| 2012/0098960 A1 | 4/2012 | Fujino et al. | |
| 2012/0129574 A1 * | 5/2012 | Reed | G06T 1/0021 455/556.1 |
| 2014/0059462 A1 * | 2/2014 | Wernersson | G06T 5/50 715/771 |
| 2015/0061541 A1 * | 3/2015 | Gandini | H05B 37/0272 315/294 |
| 2015/0248228 A1 * | 9/2015 | Seuntiens | H05B 37/029 715/765 |
| 2015/0264296 A1 * | 9/2015 | Devaux | H04N 5/77 386/226 |
| 2016/0093011 A1 * | 3/2016 | Reed | G06T 1/0021 348/222.1 |

OTHER PUBLICATIONS

U.S. Appl. No. 61/357,864, filed Jun. 23, 2010.

* cited by examiner

DETECTING ENCODED SIGNALS UNDER ADVERSE LIGHTING CONDITIONS USING ADAPTIVE SIGNAL DETECTION

RELATED APPLICATION DATA

This application is a continuation of U.S. application Ser. No. 13/165,564, filed Jun. 21, 2011 (now U.S. Pat. No. 9,147,222) which claims benefit of U.S. Provisional Application No. 61/357,864, filed Jun. 23, 2010.

This application is related to U.S. patent application Ser. No. 12/634,505, filed Dec. 9, 2009 (published as US 2010-0150396 A1) and Ser. No. 12/337,029, filed Dec. 17, 2008 (published as US 2010-0150434 A1).

Each of the above patent documents is hereby incorporated by reference in its entirety.

TECHNICAL FIELD

The present disclosure relates generally to encoded signals, steganographic data hiding and digital watermarking. In some areas, the present disclosure relates to a dynamic signal detector that adapts operation based on lighting information. In other areas, the present disclosure relates to embedding signals in anticipation of the type of likely lighting conditions present during image capture.

BACKGROUND AND SUMMARY

The term "steganography" generally infers data hiding. One form of data hiding includes digital watermarking. Digital watermarking is a process for modifying media content to embedded a machine-readable (or machine-detectable) signal or code into the media content. For the purposes of this application, the data may be modified such that the embedded code or signal is imperceptible or nearly imperceptible to a user, yet may be detected through an automated detection process. Most commonly, digital watermarking is applied to media content such as images, audio signals, and video signals.

Digital watermarking systems may include two primary components: an embedding component that embeds a watermark in media content, and a reading component that detects and reads an embedded watermark. The embedding component (or "embedder" or "encoder") may embed a watermark by altering data samples representing the media content in the spatial, temporal or some other domain (e.g., Fourier, Discrete Cosine or Wavelet transform domains). The reading component (or "reader" or "decoder") analyzes target content to detect whether a watermark is present. In applications where the watermark encodes information (e.g., a message or payload), the reader may extract this information from a detected watermark.

A watermark embedding process may convert a message, signal or payload into a watermark signal. The embedding process may then combines the watermark signal with media content and possibly another signals (e.g., an orientation pattern or synchronization signal) to create watermarked media content. The process of combining the watermark signal with the media content may be a linear or non-linear function. The watermark signal may be applied by modulating or altering signal samples in a spatial, temporal or some other transform domain.

A watermark encoder may analyze and selectively adjust media content to give it attributes that correspond to the desired message symbol or symbols to be encoded. There are many signal attributes that may encode a message symbol, such as a positive or negative polarity of signal samples or a set of samples, a given parity (odd or even), a given difference value or polarity of the difference between signal samples (e.g., a difference between selected spatial intensity values or transform coefficients), a given distance value between watermarks, a given phase or phase offset between different watermark components, a modulation of the phase of the host signal, a modulation of frequency coefficients of the host signal, a given frequency pattern, a given quantizer (e.g., in Quantization Index Modulation) etc.

The present assignee's work in steganography, data hiding, digital watermarking and signal detection is reflected, e.g., in U.S. Pat. Nos. 7,072,487; 6,947,571; 6,912,295; 6,891,959; 6,763,123; 6,718,046; 6,614,914; 6,590,996; 6,522,769; 6,408,082; 6,122,403 and 5,862,260, and in published specifications WO 9953428 and WO 0007356 (corresponding to U.S. Pat. Nos. 6,449,377 and 6,345,104), and in published U.S. Patent Application No. US 2008-0298632 A1. Each of the patent documents mentioned in this paragraph is hereby incorporated by reference in its entirety. Of course, a great many other approaches are familiar to those skilled in the art. The artisan is presumed to be familiar with a full range of literature concerning steganography, data hiding and digital watermarking.

A so-called "fingerprint" may include characteristic features used to identify a video or image. Such characteristic features can be derived, calculated or extracted from an image or video itself. Some such characteristic features may include, e.g., frequency domain features, peaks, power characterizations, amplitude values, statistical features, key frame analysis, color, motion changes during a video sequence, and/or others. Characteristic features (e.g., one or more fingerprints) of artwork, or a portion thereof, can be distilled into a set of numbers, or features, which can be stored in a database, and later matched against unknown works to identify the same. A fingerprint also can be used to link to or access remote data. Example image and video fingerprinting techniques are detailed, e.g., in U.S. Pat. Nos. 7,930,546, 7,289,643, and 7,020,304 (Digimarc); U.S. Pat. No. 7,486,827 (Seiko-Epson); 20070253594 (Vobile); 20080317278 (Thomson); and 20020044659 (NEC). Each of the patent documents mentioned in this paragraph is hereby incorporated by reference in its entirety.

One possible combination of the present disclosure includes a method comprising: obtaining data representing imagery or video, the imagery or video having been captured with a camera; obtaining lighting information associated with image capture of the imagery or video; based on the lighting information, adapting a signal detection process; and using a programmed electronic processor, analyzing the data to determine whether a signal is encoded therein, said act of analyzing utilizes an adapted signal detection process. Of course, different combinations and claims are provided too.

Another combination includes a cell phone having: a camera for capturing imagery or video; and one or more electronic processors. The one or more electronic processors are programmed for: obtaining data representing imagery or video captured with the camera; obtaining lighting information associated with the captured imagery or video; based on the lighting information, adapting a signal detection process; analyzing the data to determine whether a signal is encoded therein, said analyzing utilizes the adapted signal detection process.

Still another combination includes a method comprising: obtaining lighting information associated with image or video capture; adapting a signal detection process to deemphasize signal contribution of the blue channel when the lighting information is associated with incandescent lighting; and using an electronic processor programmed with the adapted signal detection process, analyzing image or video data to determine whether a signal is encoded therein.

Yet another combination includes a method comprising: obtaining data representing captured imagery or video, the imagery or video having been captured with a camera; using a programmed electronic processor, analyzing the data to determine image statistics, the image statistics identifying a first region and a second region, in which the first region and the second region include different lighting characteristics; adapting a signal detector in a first manner for analyzing data in the first region, and adapting a signal detector in a second, different manner for analyzing data in the second region.

Another combination includes a method comprising: obtaining lighting information associated with image or video capture; adapting a signal embedding process to embed a digital watermark signal at a uniform embedding strength across two color channels when the lighting information is associated with incandescent lighting; and using an electronic processor programmed with the adapted signal embedding process, embedding an image or video to include the digital watermark signal across the two color channels.

Further combinations, aspects, features and advantages will become even more apparent with reference to the following detailed description and accompanying drawing.

DETAILED DESCRIPTION

We have found ways to improve detection of signals hidden in various color channels, under sometimes adverse lighting conditions. For example, we have improved detection of encoded signals hidden in two or more chrominance directions by adapting detection based on lighting conditions. These improvements include a consideration of various lighting information (e.g., in terms of color temperature and/or light intensity) and signal encoding techniques.

An exemplary use scenario operates on a color image or video including a signal encoded therein. One type of encoding encodes digital watermarking in a plurality of color channels. For example, the color image or video may be represented in the industry standard luminance and chrominance color space called "Lab" (for Lightness (or luminance), plus 'a' and 'b' color channels). Of course, the present disclosure will apply to and work with other color schemes and techniques as well. For example, alternative luminance and chrominance color schemes include "Yuv" (Y=luma, and 'u' and 'v' represent chrominance channels) and "Ycc" (also a dual chrominance space representation).

In a case where a media signal includes (or may be represented by) at least two chrominance channels, a watermark embedder may insert the same digital watermark signal in both the 'a' color direction and 'b' color direction. In one example the 'a' color direction represents a "blue/yellow" color direction, and the 'b' color direction represents a "red/green" color direction. This type embedding can be performed in parallel (if using two or more encoders) or serial (if using one encoder). The watermark embedder may vary the gain (or signal strength) of the watermark signal in the 'a' and 'b' channels to achieve improved hiding of the watermark signal. For example, the 'a' channel may have a watermark signal embedded with signal strength (or intensity) that is greater or less than the watermark signal in the 'b' channel. A Human Visual System response indicates that about twice the watermark signal strength can be embedded in the blue/yellow channel as the red green channel and still achieve favorable (e.g., equalized) visibility. Alternatively, the watermark signal may be embedded with the same strength in both the 'a' and 'b' channels. Regardless of the watermark embedding strength, watermark signal polarity is preferably inverted in the 'b' color plane relative to the 'a' color plane. The inverted signal polarity is represented by a minus ("−") sign in equation 2.

$$WMa = a(\text{channel}) + wm \quad (1)$$

$$WMb = b(\text{channel}) - wm \quad (2)$$

WMa is a watermarked 'a' channel, WMb is a watermarked 'b' channel, and wm represents a watermark signal. A watermarked color image or video (including L and WMb and WMa) can be provided, e.g., for printing, digital transfer or viewing. When printing this type of watermarking in newspaper print the watermark signal is mainly in yellow and magenta colors. Capture, e.g., with a cell phone, of such newspaper print utilizes at least the blue and green channels under white fluorescent lighting.

An encoded signal may include a message or payload having, e.g., a link to a remote computer resource, metadata or ownership information. The color image or video is rendered (e.g., printed, distributed or displayed). A user, e.g., equipped with a camera enabled cell phone, captures an image of an encoded color image or video with her cell phone camera. The captured image data is analyzed by a signal detector (embedded in the cell phone) to recover the message or payload. The present disclosure provides methods and apparatus to improve the detection of such encoded signals.

While the present disclosure focuses on detection of encoded signals with a handheld device (e.g., camera equipped cell phone), other devices may be used as well. For example, digital cameras, scanners, web cameras, etc. may include or communicate with a detector. Thus, reference to a cell phone should not limit this disclosure.

Figure 1:
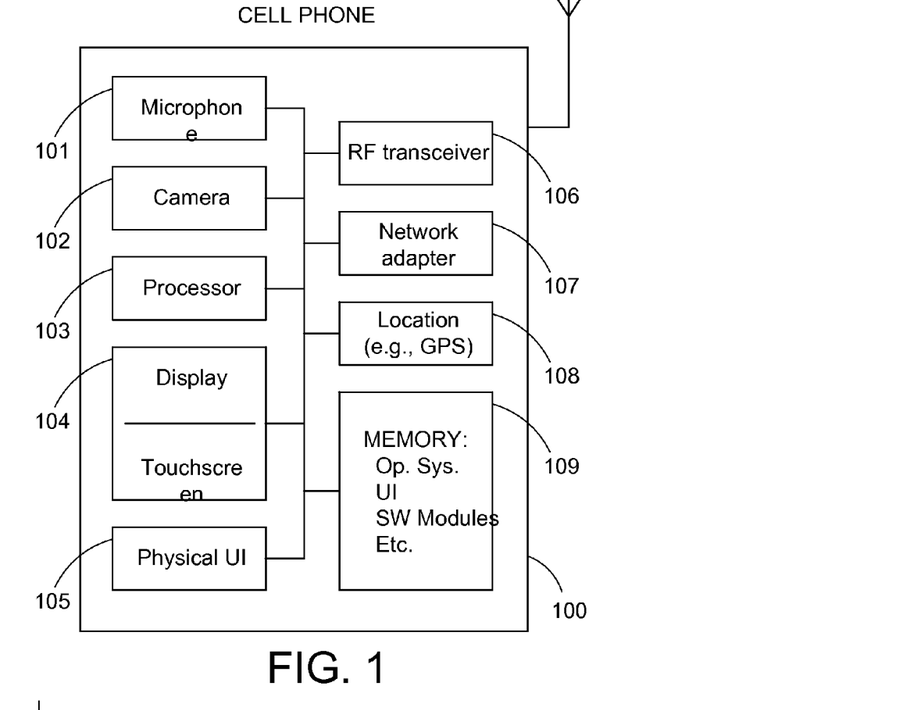
FIG. 1 is a block diagram illustrating an exemplary cell phone.

FIG. 1 shown an exemplary cell phone, including, e.g., elements such as a microphone, a camera, a processor, a display/touchscreen, a physical user interface, a RF transceiver, location module (e.g., GPS), network adaptor and memory. The memory may store operating system software, user interface software, signal detector software, other functional software modules, etc. Of course, cell phones including more or less features will also benefit from the present disclosure.

Signal noise in a captured image may be dependent on illumination conditions. Generally, the lower the light level during image capture, the more noise that will be present in a captured image. This noise appears to include random noise from a camera sensor. Noise is particularly severe for cell phones which have small image sensors and capture less light and, thus, have higher noise levels in captured imagery. Noise can be further amplified in color cameras where additional amplification is sometimes used for the blue color channel in comparison to the green or red channels. Thus, in such cases, there is additional observable noise in the blue channel.

Because of the association of noise and lighting conditions, we achieve favorable detection results when lighting conditions are considered in the detection process, e.g., lighting level (e.g., lux level) and/or color temperature (e.g., type of lighting).

Before we discuss specific detection processes, we offer a few comments on lighting sources and color temperature.

Figure 2:
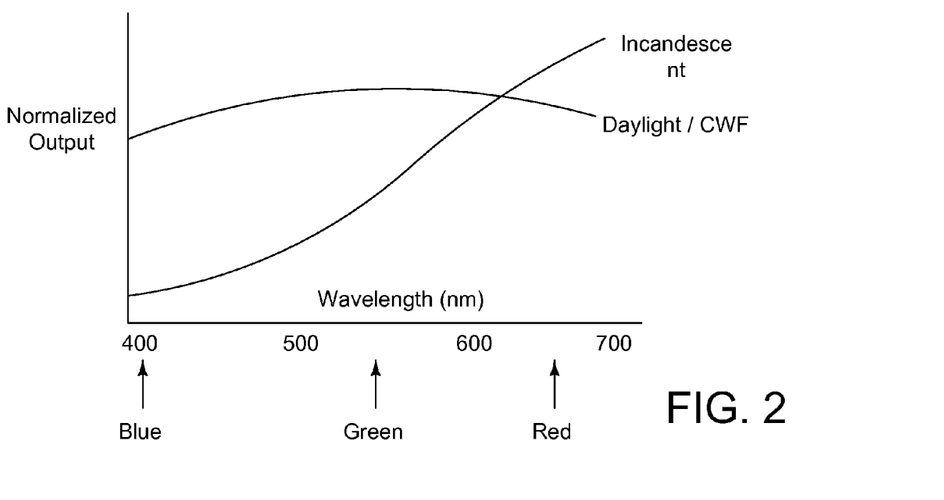
FIG. 2 is a diagram showing the spectra of incandescent light versus daylight/cool white fluorescent lighting.

The spectral power distribution of a cool white fluorescent bulb ("CWF") is similar to daylight and reasonably balanced across the spectrum (see FIG. 2). Under these conditions, and with a signal encoded with a bias toward the blue channel (e.g., an embedding ratio of 2:1 across the blue/yellow and red/green channels), the encoded signal has most of the signal energy in blue and a signal detector reads the signal well with this lighting. An embedding ratio of 2:1 may indicate that there is twice the signal (e.g., in terms of strength, intensity or magnitude) in the blue/yellow channel relative to the red/green channel. An embedding ratio of 2:1 under these lighting conditions yields favorable imperceptible encoding.

In contrast to CWF lighting, incandescent lighting has an irregular power distribution across the spectrum as shown in FIG. 2. Visible blue light has a wavelength of about 400 nm, while visible red light has a wavelength of about 650 nm. As a result, the blue channel only has about one tenth of the light as in the red channel under incandescent lighting. As mentioned above, lower light levels during image capture are prone to introduce more noise in captured imagery. Additionally, the blue channel is more prone to sensor noise amplification as well. Thus, under incandescent lighting, the blue channel as captured with a cell phone camera may be a noisy channel.

As mentioned above, lighting conditions are preferably considered in a detection process, e.g., lighting level (e.g., lux level) and/or color temperature (e.g., type of lighting).

In low illumination situations, e.g., round 50 lux and below (as one might find at a pub or low-light home environment) the blue channel may be noisy. Such noise may outweigh or interfere with any watermark signal information in this color channel. Thus, regardless of the type of color temperature, we can deemphasize signal contribution from the blue channel. One example is:

Gray=0.5*red−0.5*green+128

The term "Gray" represents grayscale information at a particular image or video location or pixel. In this equation, the grayscale value per location or pixel is 8-bits, but the techniques are not limited to this. The detector receives such grayscale information over an image area or over the entire image or video frame, and operates on such collective information to detect the encoded signal therefrom. In this example, the detector operates on grayscale information representing portions of the red color channel (e.g., per location or pixel) and green color channel (e.g., per location or pixel), but not the blue color channel. The "128" in the above equation is used as a normalizing value to maintain an 8-bit grayscale value. Otherwise, the resulting value may be above 255 or below 0 (e.g., exceed an 8-bit number).

For high illumination situations, e.g., around 260 lux and above (as one might find at an office), the noise in the blue channel is less. Moreover, the color channels can be weighted for detection in a manner roughly proportional to the light in the various color channels and take advantage of the signal information from the blue channel. One example is:

Gray=0.19*red−0.5*green+0.31*blue+128

Like above, the term "Gray" here represents grayscale information at a particular location or pixel. This equation can be used for each location (or a portion of locations) in captured imagery. In this example, the detector operates on grayscale information representing portions of the red color channel (e.g., per location or pixel), green color channel (e.g., per location or pixel), and blue color channel (e.g., per location or pixel) in a manner weighted roughly according to light distribution. Of course, and as with the other equations, different weighting coefficients may be used to match or coincide with particular lighting sources. Thus, these weights are exemplary and should not limit the scope of the disclosure.

In these high and low light situations, light intensity is more important than color temperature. Things get a bit trickier when considering mid level illumination.

For intermediate light levels, example detection weightings may include:

Medium low (~120 lux) gray=0.29*red−0.5*green+0.21*blue+128−CWF.

gray=0.5*red−0.5*green+128−Incandescent.

Medium high (~190 lux) gray=0.39*red−0.5*green+0.11*blue+128.

To improve detection under adverse lighting conditions one can optimize both embedding and detection for the expected lighting conditions. For example, to be more robust under incandescent lighting, the embedding can be adjusted to put more signal in the red channel, where most of the incandescent light energy is. In one embedding example, a signal is embedded in a color image or video with a 1:1 embedding ratio across the blue/yellow:red/green channels so that the signal energy is more evenly provided across red, green and blue channels. In another embedding example, a signal is embedded in a color image or video with a 1:2 embedding ratio across the blue/yellow channel and red/green channel so that the signal energy is more weighted to the red/green channel. Other ratios can be determined according to particular lighting characteristics.

Figure 3:
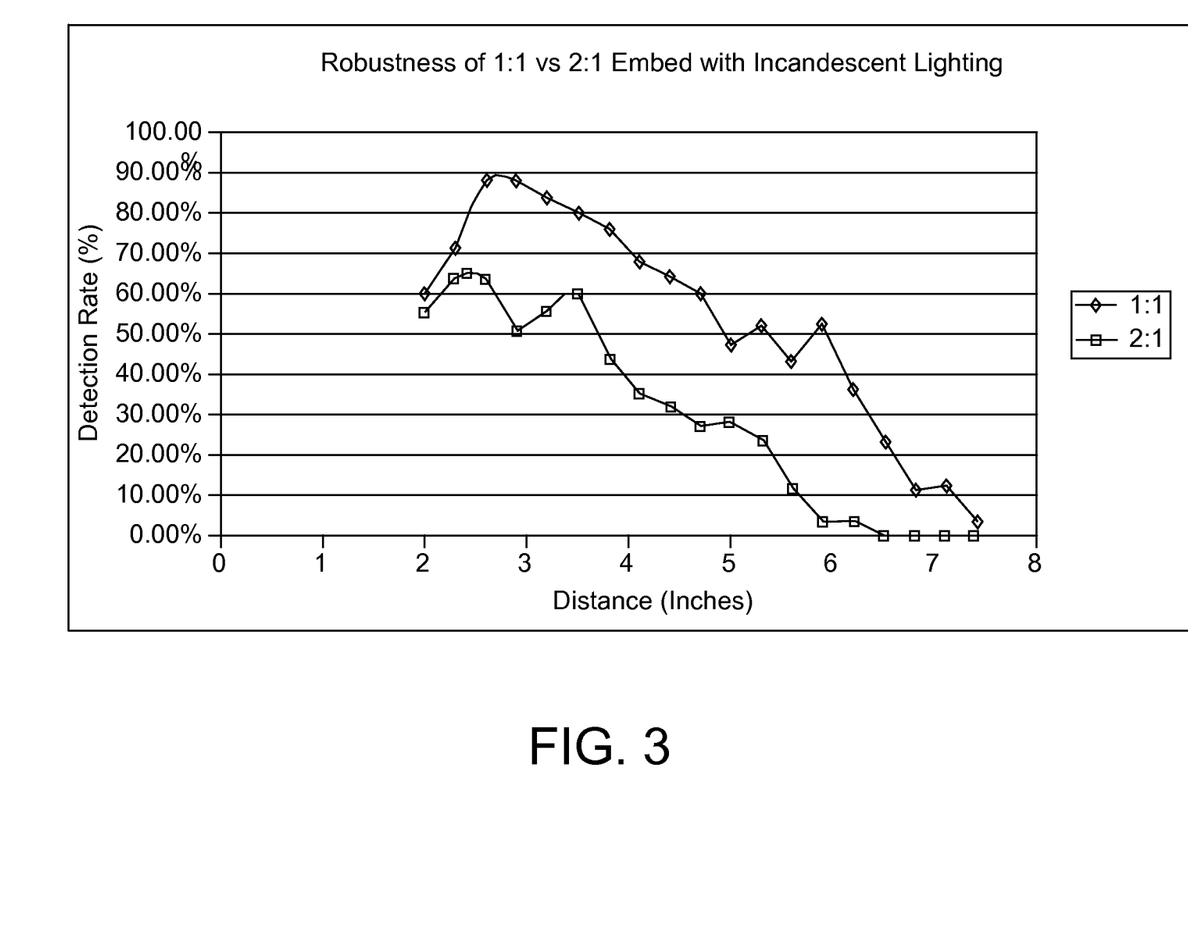
FIG. 3 is a diagram showing detection rates of a 1:1 embedding channel ratio vs. a 2:1 embedding channel ratio (blue/yellow:red/green) using the same detection weightings.

Detection rates of a 1:1 embedding ratio versus a 2:1 embedding ratio (blue/yellow:red/green channels) under incandescent low lighting is shown in FIG. 3 (using the same detection color channel weightings). As shown, 1:1 embedding can improve detection rates.

Despite an even (or even a red/green biased) embedding, under incandescent lighting the blue channel is still noisy due to low illumination, and detection may be compromised. We can further deemphasize impact of this noisy blue channel by only detecting the signal from the red and green channel. In one example, a grayscale detector operates on red minus green information as shown below:

Gray=0.5*red−0.5*green+128

The term "Gray" represents grayscale information at a particular location or pixel. This equation can be used for each location (or a portion of locations) in captured imagery. In this example, the detector operates on grayscale information representing portions of the red color channel (e.g., per location or pixel) and green color channel (e.g., per location or pixel).

Figure 4:
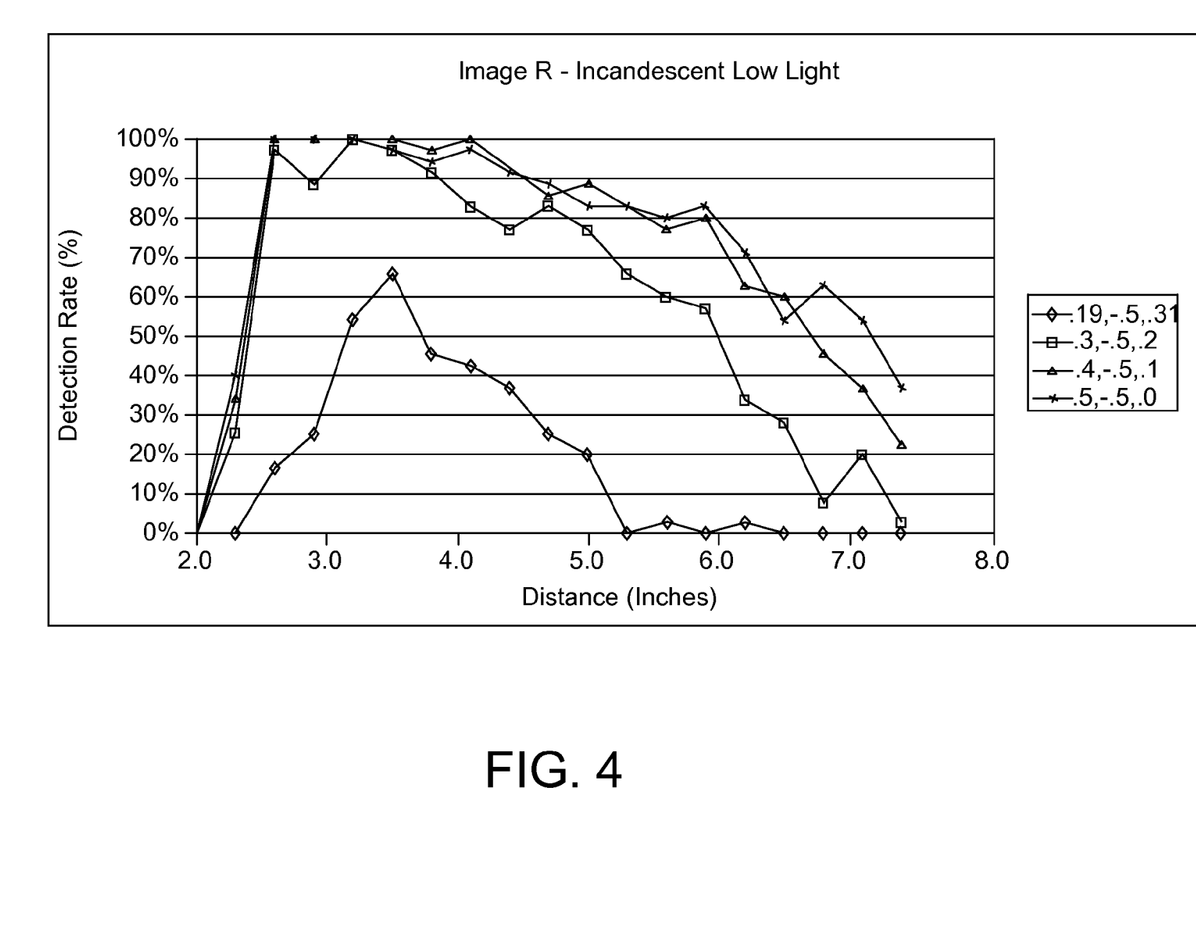
FIG. 4 is a diagram showing detection rates with incandescent low lighting, using a 1:1 embedding channel ratio, and graphed showing different color channel weightings.

Other color channel weightings can be used as well. For example, FIG. 4 is a diagram showing detection rates with incandescent low lighting, using a 1:1 embedding ratio, and different color channel weightings. The following color channel detector weights are used in FIG. 4:

| RED | GREEN | BLUE |
|---|---|---|
| .19 | −.5 | .31 |
| .3 | −.5 | .2 |
| .4 | −.5 | .1 |
| .5 | −.5 | 0 |

As seen in FIG. 4, more favorable detection rates are achieved as the blue channel is deemphasized under Incandescent low light. At an imaging capture distance beyond about 3.2 inches, the 0.1 and 0 weights for the blue channel yield better detection rates. The above weightings are provided by way of example, and are not intended to limit the scope of this disclosure.

As a comparison, in higher lighting conditions and under CWF lighting, better detection rates beyond about 3.2 inches are achieved when the blue channel is included and not deemphasized as in FIG. 4. The following color channel detector weights are used in FIG. 5. (The following weightings are provided by way of example, and are not intended to limit the scope of this disclosure.)

Figure 5:
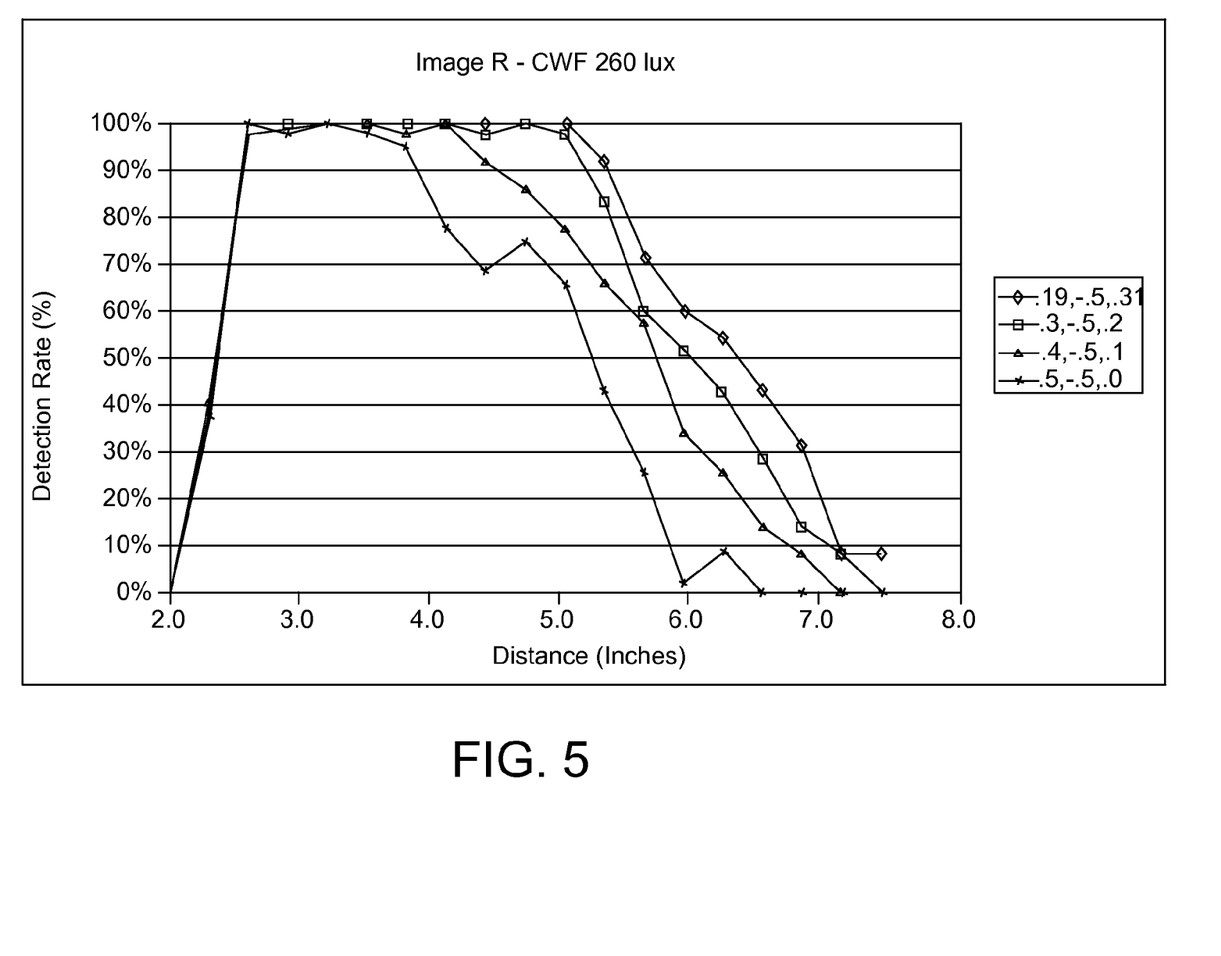
FIG. 5 is a diagram showing detection rates with cool white lighting, using a 1:1 embedding channel ratio, and graphed showing different color channel weightings.

| RED | GREEN | BLUE |
|---|---|---|
| .19 | −.5 | .31 |
| .3 | −.5 | .2 |
| .4 | −.5 | .1 |
| .5 | −.5 | 0 |

Figure 6:
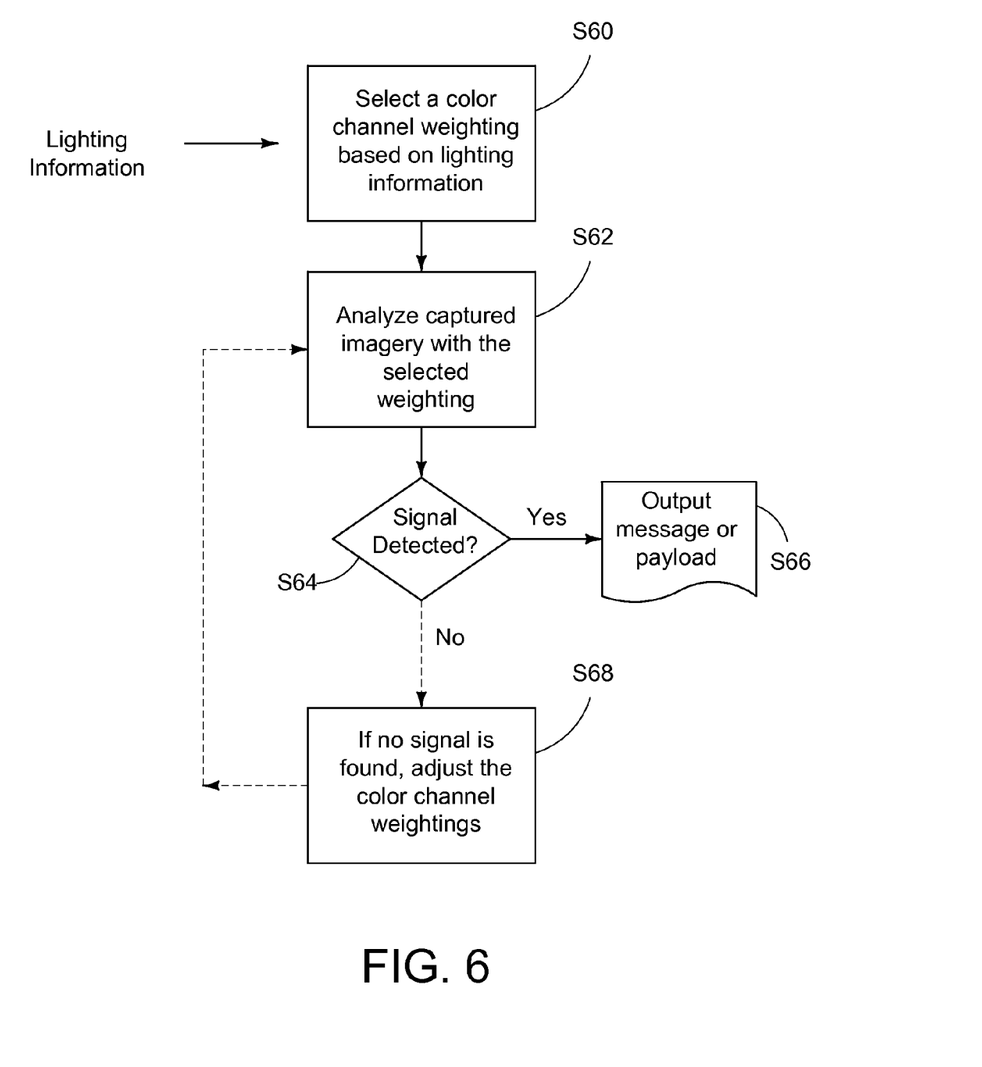
FIG. 6 is a diagram showing one example of a dynamic signal detector, in which detection is adapted based on lighting information.

With reference to FIG. 6, a signal detector may adapt its detection process based on lighting information to optimize detection. For example, the detector can change how it operates on image data (e.g., changing detection color channel weightings, using different detection algorithms, deemphasizing input from certain color channels, etc.) based on information pertaining to lighting. Lighting information can be determined in a number of ways. For example, a user may be prompted to enter the type of lighting via a UI on a cell phone. The UI may present predetermined choices (e.g., outdoors, indoors, incandescent lighting, cool white light, etc.), e.g., on a touch screen for user selection.

A GPS or location module may be used to determine whether the cell phone (or other device) is located indoors or outdoors. For example, GPS coordinates can be provided to, e.g., Google maps or other location/mapping service. The cell phone (or service) may use the GPS coordinates to determine whether they overlap or correspond to a structure, building or outdoors. This information (e.g., outdoors) maybe used to determine the type of lighting information (e.g., daylight). If a time indicator indicates nighttime (e.g., dark), the process can be configured to provide lighting information associated with a cell phone camera flash.

Another option is for the signal detector to receive lighting information from a camera on the cell phone, e.g., the auto-white balance algorithm in the camera. The auto-white balance is associated with "color temperatures," a way of quantifying the color of light. Such color temperature information can be used to determine the type of lighting or lighting information. For example, a predetermined auto white balance value (or range of values) can be used to indicate that the current lighting source is more likely to correspond to, e.g., red light (e.g., more likely incandescent lighting).

Another method may examine image statistics (e.g., using image histograms) associated with captured imagery. For example, a magnitude of high frequency noise levels in the blue channel can be analyzed to determine the type of lighting. In this image histogram example, a predetermined noise level in the blue channel may be used to indicate incandescent lighting; or a noise level below such predetermined level may be used to indicate CWF lighting. Intermediate noise levels may be used to indicate intermediate lighting.

Analyzing image statistics may also be used to determine different lighting regions within a captured image or video. For example, after analyzing image statistics, an image may be determined to predominately correspond to CWF lighting. However, the image statistics may identify regions within the image that may include shadows or other lighting issues. These statistics can be used by the detector to use a first detection process for the majority of the image, and a second detection process for the shadow (or different lighting conditions) areas.

Analyzing image statistics may also include an analysis of a ratio(s) of one color channel to other color channels (e.g., Blue vs. Red; Blue vs. Red/Green; Blue vs. Green; Green vs. Red, and/or so on). One way to establish a ratio(s) is to find minimum points, maximum points and quartile points in the color channels (e.g., histograms can be used to determine such). Ratios can be determined e.g., during color conversion. A detector can be trained to recognize certain types of lighting based on a given ratios. For example, a detector can be trained against a set of captured color images or video. The image set would preferably have varied color biases (e.g., red, blue, green, black, etc.), and be captured across different lighting conditions (e.g., low light, regular light, incandescent lighting, CWF, sunlight, black light, colored lights, etc.). Ratios can be matched to known lighting conditions (and/or known image content), and color weightings can be determined for those ratios. Once this ratio (and corresponding color weighting) information is collected during training, the detector can assign predetermined color weightings going forward based on determined color channel ratios.

Additionally, a cell phone or other imaging device may also include or communicate with a light meter. The light meter may provide information regarding the light level (e.g., light intensity). This light level information may be used as lighting information to adapt a detection process or signal detector.

Returning to FIG. 6, in one implementation, the signal detector uses lighting information to select a color channel weighting. For example, if the lighting information indicates that the lighting source is more likely to be CWF, under regular lighting levels, the detector may select and use the Gray=0.19*red−0.5*green+0.31*blue+128 weightings (or other weighting determined for this type of lighting). The detector may use the lighting information to look up weightings in a table, registry or database. Or, the detector may be preprogrammed to use certain weightings based on the lighting information. If a signal is detected by the detector, the corresponding message or payload may be output or communicated (e.g., to another process in the cell phone, for display to the user, to a remotely located device, to a home or office network, etc.). If the signal is not detected, the detector may, optionally, decide to adjust the weightings and try detection again.

In accordance with other aspects of the present disclosure, shadows are addressed.

Figure 7:
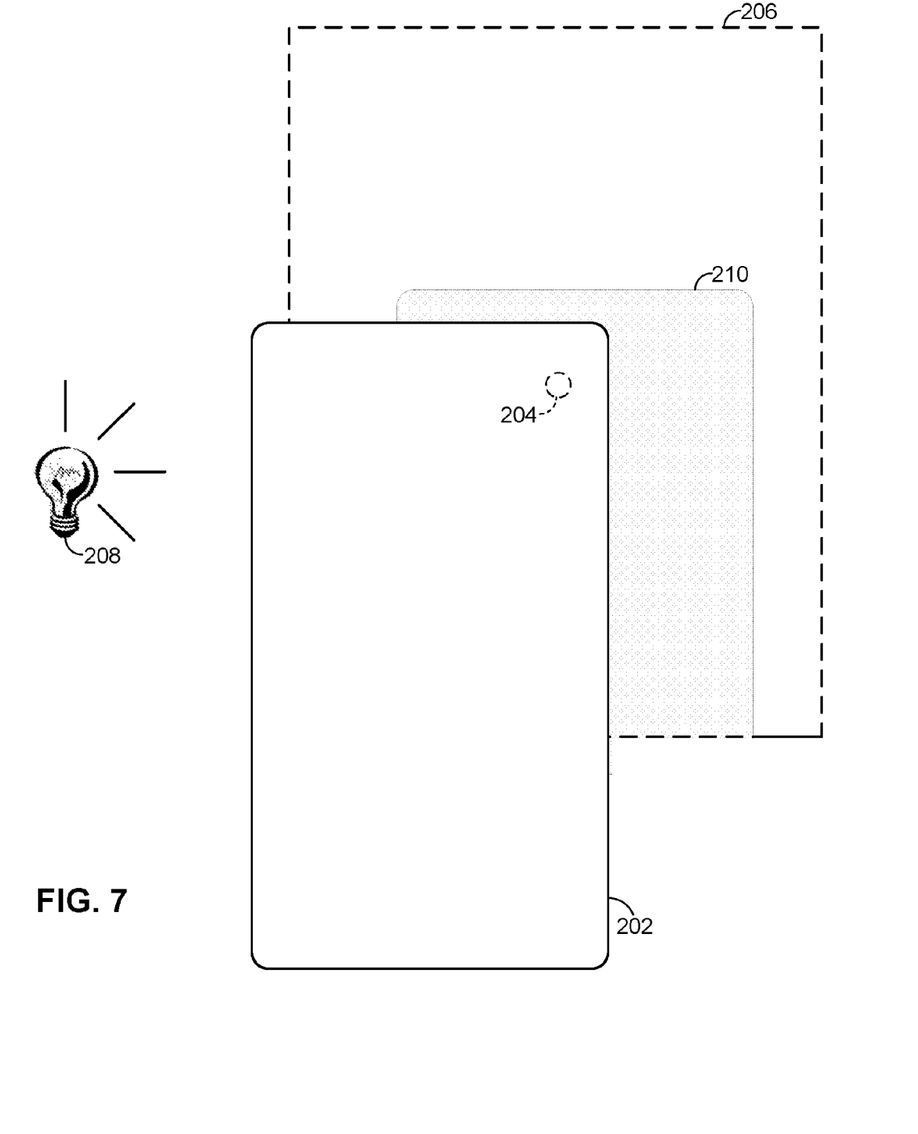
FIG. 7 illustrates a smart phone camera casting a shadow on an object.

Often, when a smart phone camera is used to capture imagery of a watermarked object, or to capture imagery to perform a so-called fingerprinting process, the smart phone casts a shadow on the object. Such a situation is shown in FIG. 7. A smart phone 202 includes a camera system (indicated by the position of a lens 204 on the back side of the phone) that captures image data from a rectangular area 206. The smart phone 204 blocks some of the light illuminating the area 206, casting a shadow 210.

Although shadow 210 is shown as uniform, typically it varies in darkness—becoming less distinct at the outer edges, particularly with diffuse lighting.

Shadow 210 can be detected, and addressed, in various ways.

One way to detect the shadow is to analyze the captured image data for a contour that mimics, in part, the profile of the cell phone. Edge finding algorithms are well known, and can be applied in this application. Aiding identification of the shadow is the fact that edges of the shadow are usually parallel with edges of the captured image frame (at least for generally rectangular smart phones, held parallel to the imaged area 206). Once candidate edges are found in the image data, they can be matched against a series of reference templates corresponding to shadows produced by different edges of the smart phone, and under different lighting conditions, to identify the shadow edge.

To reduce confusion with other subjects within the camera's view, the edge identification can be conducted by analyzing luminance channel data—disregarding color information.

Another technique for shadow identification briefly strobes the scene with a flash from the smart phone camera (e.g., by an LED light directed into the camera's field of view). An image frame without the strobe is compared with an image frame that is illuminated with the extra lighting—analyzed for edges found in the former that are missing in the latter. Such edges correspond to shadows cast by the phone.

Figure 8A:
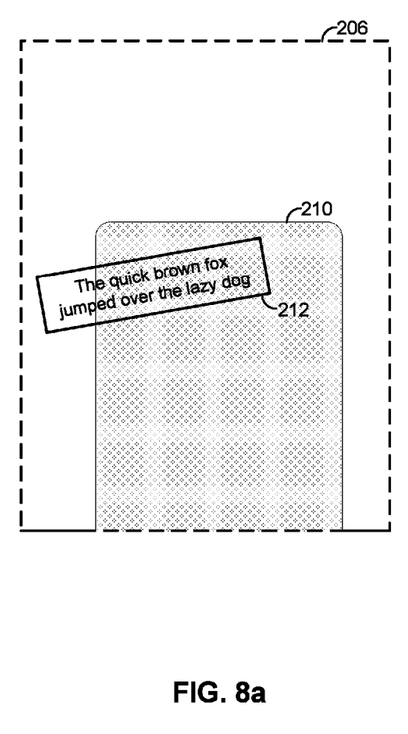
FIG. 8a and FIG. 8b illustrate apparent movement between a shadow and an object being imaged.
Figure 8B:
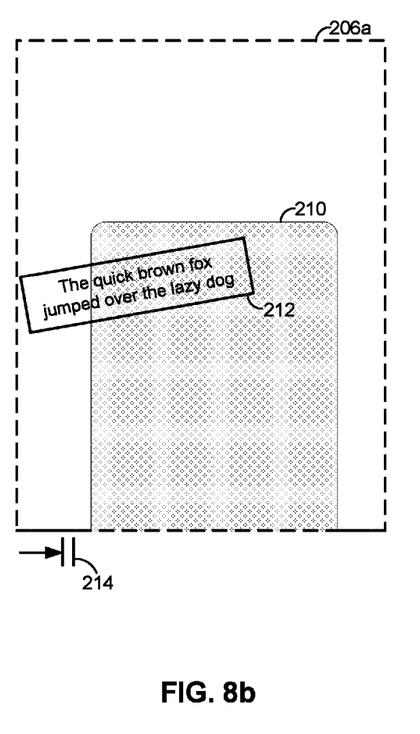

Another way of identifying the shadow 210 exploits the fact that, if the phone is moved, the shadow's position within the field of view is generally stationary, whereas the subject being imaged apparently moves. This is illustrated in FIGS. 8a and 8b. In these drawings the camera captures imagery from a field of view area 206 including a piece of paper 212. The paper is printed with text.

As the user positions the camera to frame the desired shot (or as the camera is slightly jittered by the user's hand in normal use), the apparent position of the piece of paper 212 within the field of view 206 moves. However, the shadow 210 is essentially fixed in the frame (since the camera casting the shadow moves with the field of view). By analyzing two or more frames, the image data can be resolved into two components: image features that change position (e.g., features from the printed paper 212) and image features that are apparently static (e.g., the shadow edges).

In the example illustrated, it can be seen that the shadow 210 of the smart phone in FIG. 8a encompasses the "e" in "The," and the "e" in "jumped." In FIG. 8b, the phone has been pointed a bit more to the right (indicated by displacement 214), so the left edge of the paper is depicted nearly at the left edge of the image frame. The shadow no longer encompasses the "e" s. The shadow has stayed stationary; the subject imagery has appeared to move.

By spatially correlating frames of image data captured at different instants, the static features can readily be identified (e.g., the shadow boundary). Again, such operation is desirably performed in luminance data, so to reduce confusion with other features.

Once the shadow edges have been identified (by the foregoing, or other techniques), subsequent processing can mitigate the effects of the shadow.

One approach is simply to recognize that the shadowed region is inferior in image quality, and to disregard it—where possible. Thus, for example, in ranking candidate pixel regions for submission to a watermark detector, the shadowed regions may be discounted.

Another approach is to compensate the captured imagery to redress the shadowing effect.

One way to do this is to estimate the reduction in subject luminance caused by the shadow at different points in the image frame, and then adjust the luminance across the image reciprocally. This can be done by exploiting the fact that natural imagery is highly spatially correlated. (If one pixel is purple in color, then the probability that a nearby pixel is also purple in color is much greater than would occur with random chance alone.)

Consider the example of FIGS. 8a and 8b. The substrate of paper 212 has a background color, which is reflected in captured image pixel values. In an LAB or other dual chrominance space representation, the color data corresponding to these pixels depicting the paper background is invariant with illumination; chrominance does not change with shadowing.

To compensate the imagery for the shadow, the image is analyzed for one or more spatially close pairs of pixel regions—one falling inside the shadowed region, and one falling outside—with similar color values. The paper substrate is an example. The method assumes that where spatially close regions are also close in chrominance values, that they form part of a common object (or similar objects) within the camera's field of view. If they form part of a common or similar object, and are similar in chrominance, then the difference in luminance is a measure of the shadow's darkness at the shadowed of the two regions.

By examining the luminance at different pixels representing the paper 212, the luminance profile of the shadow—at least in the region of the paper 212—can be determined. Likewise with other regions of similar chrominance found on both sides of the shadow boundary. A complementary luminance correction can then be applied—brightening the pixels in the shadowed region to match the luminance of similarly-colored pixels that are nearby yet unobscured by shadow. (Darkening the pixels outside the shadow is also a possibility.)

Spatial proximity of similarly-colored regions is desired, but is not essential. The same technique is applicable even if similarly-colored regions are found at opposite edges of the image frame.

It will be recognized that many environments have different illumination sources. A typical scenario is an interior space with exterior windows, which also has overhead incandescent or fluorescent lighting. The natural lighting through the windows provides a spectrum different than the artificial lighting. The shadowing caused by the smart phone typically blocks one light source (e.g., the artificial lighting) more than the other.

By assessing the image chrominance in a shadowed region versus in an un-shadowed region, information about the ambient lighting can be discerned, and further compensation may thus be applied.

Consider again the examples of FIGS. 8a and 8b. The shadow 210 may block overhead fluorescent illumination, causing the right part of the paper to be illuminated exclusively with natural daylight. The left edge, in contrast, is lit with both daylight and fluorescent illumination. These different illuminations can cause the apparent chrominance of the paper to vary from the left edge to the right edge.

Despite the variance in apparent chrominance across its length, analysis of other image features can still indicate that the region of pixels spanning the paper substrate likely corresponds to a unitary object. This can be confirmed by edge analysis (finding the outer bounding rectangle). Texture analysis can also be employed to determine that the depicted item has generally homogenous image texture within the discerned edge boundary. Similarity in chrominance (although with a larger tolerance, reflecting the different illumination) can also be used.

Once regions of a common object—some in the shadow and some out of the shadow—are identified, the chrominance of such regions can be compared. The discerned difference is likely due to absence of one light source in the shadowed region. By assessing this difference, a chrominance correction can be applied, e.g., so that the left and right edges of depicted paper substrate 212 have the same chrominance values.

Shadows can also be used as a gross measure of proximity of the cell phone camera to the object being imaged. The darker the shadow (and/or, the more well-defined the shadow boundary), the closer the camera is to the subject. If analysis of a temporal sequence of image frames shows that a shadow is becoming darker, or more distinct, the phone can infer that the camera is being moved closer to the subject, and then knows, e.g., in what direction a focus control should be adjusted.

The computing environments used to implement the above processes and system components encompass a broad range from general purpose, programmable computing devices to specialized circuitry, and devices including a combination of both. The processes and system components may be implemented as instructions for computing devices, including general purpose processor instructions for a variety of programmable processors, including microprocessors, Digital Signal Processors, etc. These instructions may be implemented as software, firmware, etc. These instructions can also be converted to various forms of processor circuitry, including programmable logic devices, application specific circuits, including digital, analog and mixed analog/digital circuitry. Execution of the instructions can be distributed among processors and/or made parallel across processors within a device or across a network of devices. Transformation of content signal data may also be distributed among different processor and memory devices.

The computing devices used for signal detection and embedding may include, e.g., one or more processors, one or more memories (including computer readable media), input devices, output devices, and communication among these components (in some cases referred to as a bus). For software/firmware, instructions are read from computer readable media, such as optical, electronic or magnetic storage media via a communication bus, interface circuit or network and executed on one or more processors.

The above processing of content signals may include transforming of these signals in various physical forms. Images and video (forms of electromagnetic waves traveling through physical space and depicting physical objects) may be captured from physical objects using cameras or other capture equipment, or be generated by a computing device. While these signals are typically processed in electronic and digital form to implement the components and processes described above, they may also be captured, processed, transferred and stored in other physical forms, including electronic, optical, magnetic and electromagnetic wave forms. The content signals can be transformed during processing to compute signatures, including various data structure representations of the signatures as explained above. In turn, the data structure signals in memory can be transformed for manipulation during searching, sorting, reading, writing and retrieval. The signals can be also transformed for capture, transfer, storage, and output via display or audio transducer (e.g., speakers).

While reference has been made to cell phones, it will be recognized that this technology finds utility with all manner of devices—both portable and fixed. PDAs, organizers, portable music players, desktop and laptop computers, tablets, pads, wearable computers, servers, etc., can all make use of the principles detailed herein. Particularly contemplated cell phones include the Apple iPhone, and cell phones following Google's Android specification (e.g., the G1 phone, manufactured for T-Mobile by HTC Corp.). The term "cell phone" should be construed to encompass all such devices, even those that are not strictly-speaking cellular, nor telephones.

(Details of the iPhone, including its touch interface, are provided in published patent application 20080174570. This published application is hereby incorporated by reference in its entirety.)

The design of cell phones and other computers that can be employed to practice the methods of the present disclosure are familiar to the artisan. In general terms, each includes one or more processors, one or more memories (e.g. RAM), storage (e.g., a disk or flash memory), a user interface (which may include, e.g., a keypad, a TFT LCD or OLED display screen, touch or other gesture sensors, a camera or other optical sensor, a microphone, etc., together with software instructions for providing a graphical user interface), a battery, and an interface for communicating with other devices (which may be wireless, such as GSM, CDMA, W-CDMA, CDMA2000, TDMA, EV-DO, HSDPA, WiFi, WiMax, or BLUETOOTH, and/or wired, such as through an Ethernet local area network, a T-1 internet connection, etc). An exemplary cell phone that can be used to practice part or all of the detailed arrangements is shown in FIG. 1, discussed above.

The processor can be a special purpose electronic hardware device, or may be implemented by a programmable electronic device executing software instructions read from a memory or storage, or by combinations thereof. (The ARM series of CPUs, using a 32-bit RISC architecture developed by Arm, Limited, is used in many cell phones.) References to "processor" should thus be understood to refer to functionality, rather than any particular form of implementation.

In addition to implementation by dedicated hardware, or software-controlled programmable hardware, the processor can also comprise a field programmable gate array, such as the Xilinx Virtex series device. Alternatively the processor may include one or more electronic digital signal processing cores, such as Texas Instruments TMS320 series devices.

Software instructions for implementing the detailed functionality can be readily authored by artisans, from the descriptions provided herein, conclusions, and other determinations noted above.

Typically, devices for practicing the detailed methods include operating system software that provides interfaces to hardware devices and general purpose functions, and also include application software that can be selectively invoked to perform particular tasks desired by a user. Known browser software, communications software, and media processing software can be adapted for uses detailed herein. Some embodiments may be implemented as embedded systems—a special purpose computer system in which the operating system software and the application software is indistinguishable to the user (e.g., as is commonly the case in basic cell phones). The functionality detailed in this specification can be implemented in operating system software, application software and/or as embedded system software.

Different of the functionality can be implemented on different devices. For example, in a system in which a cell phone communicates with a server at a remote service provider, different tasks can be performed exclusively by one device or the other, or execution can be distributed between the devices. Thus, it should be understood that description of an operation as being performed by a particular device (e.g., a cell phone) is not limiting but exemplary; performance of the operation by another device (e.g., a remote server), or shared between devices, is also expressly contemplated. (Moreover, more than two devices may commonly be employed. E.g., a service provider may refer some tasks, functions or operations, to servers dedicated to such tasks.)

In like fashion, data can be stored anywhere: local device, remote device, in the cloud, distributed, etc.

Operations need not be performed exclusively by specifically-identifiable hardware. Rather, some operations can be referred out to other services (e.g., cloud computing), which attend to their execution by still further, generally anonymous, systems. Such distributed systems can be large scale (e.g., involving computing resources around the globe), or local (e.g., as when a portable device identifies nearby devices through BLUETOOTH communication, and involves one or more of the nearby devices in an operation.) For example, a cell phone may distribute some or all of the image data and/or lighting information to the cloud for analysis, e.g., to detect an encoded signal or to determine image statistics. A detection result, a partial result or computation stages may be communicated back to the cell phone for review or further computation or actions.

CONCLUDING REMARKS

Having described and illustrated the principles of the technology with reference to specific implementations, it will be recognized that the technology can be implemented in many other, different, forms. To provide a comprehensive disclosure without unduly lengthening the specification, each of the above referenced patent documents is hereby incorporated by reference in its entirety.

While the above application discusses consideration of two lighting conditions during a detection process, e.g., lighting level (e.g., lux level) and color temperature (e.g., type of lighting), the present disclosure is not so limited. For example, a detector may only consider one of these considerations when determining color channel weightings.

The particular combinations of elements and features in the above-detailed embodiments are exemplary only; the interchanging and substitution of these teachings with other teachings in this and the incorporated-by-reference patent documents are also contemplated.

What is claimed is:

1. A method for controlling a portable apparatus, the portable apparatus comprising: a camera for capturing data representing imagery or video; a touchscreen display; a graphical user interface for providing an interface for display on the touchscreen display; an encoded signal detector; and one or more processors, said method comprising:
    obtaining data representing imagery or video captured by the camera;
    obtaining lighting information via the graphical user interface, the lighting information associated with the data representing imagery or video captured by the camera; and
    adapting the encoded signal detector based on the lighting information, in which the adapted encoded signal detector is configured to detect whether auxiliary data is encoded within the data representing imagery or video captured by the camera.

2. The method of claim 1 in which the adapting applies different weightings to different color channels of the imagery or video for detection, the different weightings being associated with the lighting information.

3. The method of claim 2 in which the lighting information is associated with incandescent lighting, and the weightings deemphasize a blue color channel.

4. The method of claim 3 in which the blue color channel is deemphasized to the point of not being used for detection.

5. The method of claim 2 in which the lighting information is associated with daylight or cool white fluorescent lighting, and the weightings are applied across red, green and blue channels.

6. The method of claim 1 in which the adapted encoded signal detector operates on a grayscale representation of the data representing imagery or video captured by the camera.

7. A method of operating a portable apparatus comprising: a camera for capturing data representing imagery or video; a touchscreen display; and one or more processors, said method comprising:
    obtaining data representing imagery or video, the imagery or video having been captured with the camera;
    obtaining lighting information associated with image capture of the imagery or video, in which the lighting information is associated with a light level or color temperature;
    adapting an encoded signal detector based on the lighting information; and
    controlling the adapted encoded signal detector to process the data representing imagery or video to determine whether auxiliary data is encoded therein.

8. The method of claim 7 in which the lighting information is associated with the light level and the color temperature.

9. The method of claim 7 in which the color temperature is associated with incandescent lighting.

10. The method of claim 8 in which the color temperature is associated with incandescent lighting.

11. The method of claim 7 in which the data representing imagery or video comprises a plurality of color channels including at least a blue channel, and in which the blue channel is deemphasized by the adapted encoded signal detector.

12. The method of 8 in which the data representing imagery or video comprises a plurality of color channels including at least a blue channel, and in which the blue channel is deemphasized by the adapted encoded signal detector.

13. The method of claim 8 in which the color temperature is associated with daylight or cool white fluorescent lighting.

14. The method of claim 7 in which said adapted encoded signal detector processes a grayscale representation of the data.

15. The method of claim 7 in which the data representing imagery or video comprises two color channels, with a watermark signal embedded in a first color channel, and the watermark signal embedded in a second color channel with a signal polarity that is inversely related to a signal polarity of the watermark signal in the first color channel.

16. A method of operating a portable apparatus comprising: a camera for capturing imagery or video; a touchscreen display; and one or more electronic processors, said method comprising:
  obtaining lighting information associated with capturing of the imagery or video by the camera;
  changing a signal fingerprinting process to deemphasize signal contribution of a blue color channel with the lighting information; and
  analyzing the data representing imagery or video to derive fingerprint information therefrom with the changed signal fingerprinting process.

17. The method of claim 16 in which the signal fingerprinting process is changed by applying different weightings to different color channels, the different weightings being associated with the lighting information, and in which the weightings deemphasize the signal contribution of the blue color channel.

18. The method of claim 16 in which the lighting information is associated with incandescent lighting.

* * * * *